May 10, 1966 H. B. DIAMANT 3,250,900

DYNAMIC PARITY COMPUTER

Filed July 6, 1962 2 Sheets-Sheet 1

INVENTOR.
HENRI B. DIAMANT
BY
[signature]
ATTORNEYS

INVENTOR.
HENRI B. DIAMANT

BY Hopgood and Calimafde

ATTORNEYS

United States Patent Office 3,250,900
Patented May 10, 1966

3,250,900
DYNAMIC PARITY COMPUTER

Henri B. Diamant, State College, Pa., assignor to HRB-Singer, Inc., State College, Pa., a corporation of Delaware Filed July 6, 1962, Ser. No. 208,135
11 Claims. (Cl. 235—153)

This invention relates to a parity computer and more particularly relates to a dynamic parity computer which determines the parity bit during the time period in which a word is shifted and written on a storage device.

Parity refers generally to the number of bits in a word of a selected category (one or zero) and parity systems are based either on odd parity or even parity. In an odd parity system, the total number of ones is odd, while in an even parity system, the total number of ones is even. In a word comprising $n$ bits, all but the last bit ($n-1$ bits) carry information while the last bit is referred to as the parity bit. In an odd parity system, the parity bit is one if the total number of ones in bits 1 through $n-1$ is even, while if such total is odd, the parity bit is zero.

Similarly, in an even parity system, the parity bit is one if the total number of ones in bits 1 through $n-1$ is odd, and the parity bit is zero if the total number of such bits is even.

Before the word is written on a storage device such as a drum, it may be stored in a shift register having a number of stages at least equal to the total number of information carrying bits. It may also be stored in any other storage medium and applied into a shifting stage coupled to the storage device. The last stage of the shift register is coupled to a writing means or amplifier for application to the drum. As the word is shifted through the register, it is desirable to determine and write the parity bit. Heretofore, it had been thought that the parity bit could be determined only after the total bits carrying the information ($n-1$) had appeared in the last stage of the register. It is recognized that it is exceptionally difficult to determine the parity bit immediately after the $n-1$ bit has appeared in the last stage and almost simultaneously write such bit into the storage drum.

Recognizing this difficulty, some prior systems have utilized a series of intermediary pulses between normal shift pulses such that the parity may be determined at the time of an intermediary pulse. However, this type of system requires additional circuitry to provide for the intermediary pulses and control therefor, thereby rendering the computer more complex, larger, and necessarily, more expensive.

Other parity systems have determined the parity of a word before it is written into the storage medium. Such systems determine the parity of a word by coupling to the individual shift register stages which receive the word bits and writing a parity bit at the end of the word and storing such bit in an appropriate stage of the shift register. Such systems require additional circuitry to form and store the parity bit before it is written onto the drum and are objectionable for the same reasons just mentioned.

According to my invention, and as a main object of my invention, I provide a parity computing system which determines the parity of the word during the time in which the word is shifted from the shift register into the storage medium.

A further object of my invention is to provide a parity computing system which makes an initial determination of parity after the $n-2$ bits has appeared in the last stage of the shift register.

Still another object of my invention is to provide a parity determining and writing system which does not require a parity bit to be formed or stored in any stage of a shift register other than in the final or readout stage.

Still another object of my invention is to provide a simple and reliable computer having relatively few circuit components and having simple logical system means to determine the parity bit after the $n-2$ bit is in the final stage of the shift register but before the $n-1$ bit is read into the storage element.

Still another object of my invention is a parity computing system in which the parity of a word is determined by a logical decision as to whether or not to complement the next to the last ($n-1$) bit to form the parity bit.

Briefly, in my invention, I count the number of ones in a word up to and including the $n-2$ bit. At that time, a logical decision is made as to whether or not the $n-1$ bit is to be utilized also as the parity bit. This decision is implemented during the time in which the $n$th bit is read into the storage element.

The above mentioned and other features and objects of this invention and the manner of attaining them will become more apparent and the invention itself will be best understood by reference to the following description of an embodiment of the invention taken in conjunction with the accompanying drawing, wherein.

Figures 1, 2, 6:
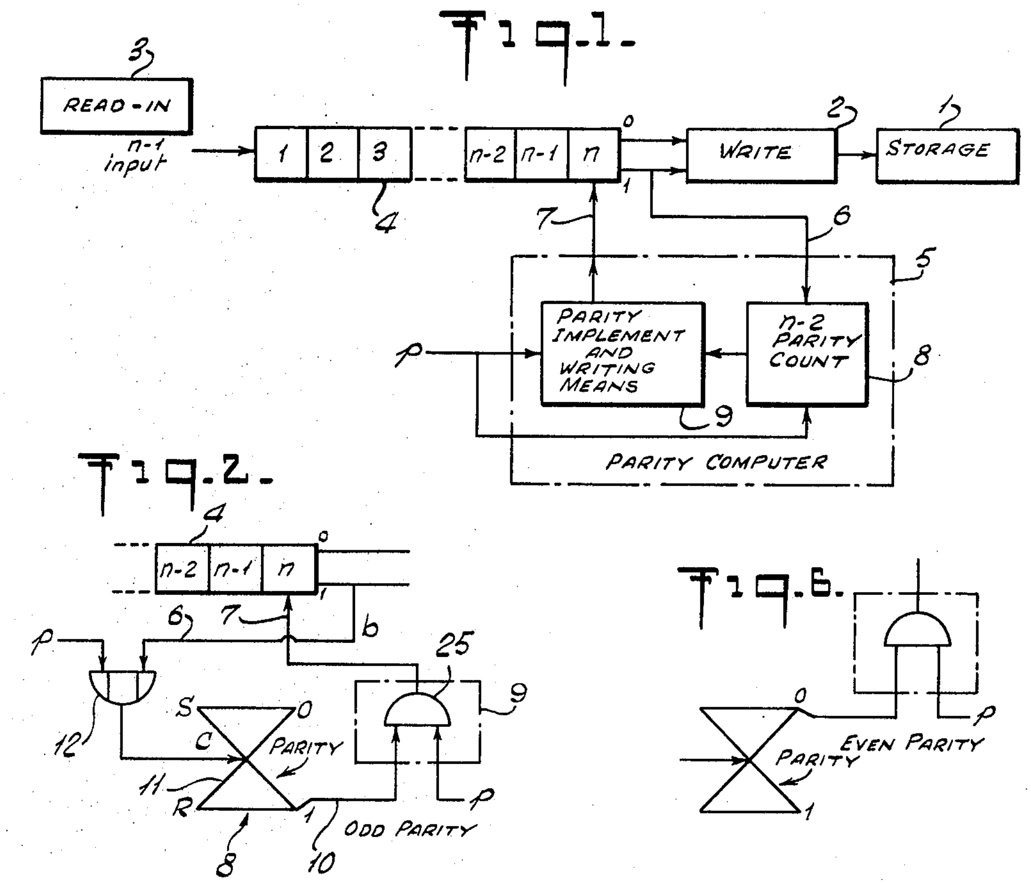
FIGURE 1 is a generalized block diagram of my invention.
FIGURE 2 is a logical diagram of one form of my invention in which odd parity is utilized.
Figure 5A:
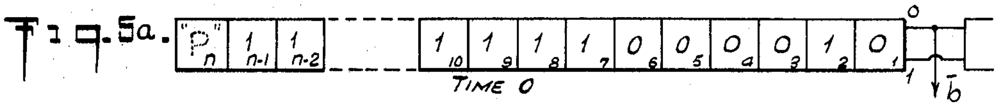
Figure 5B:
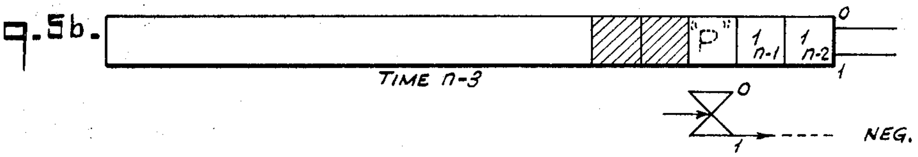
Figure 5C:
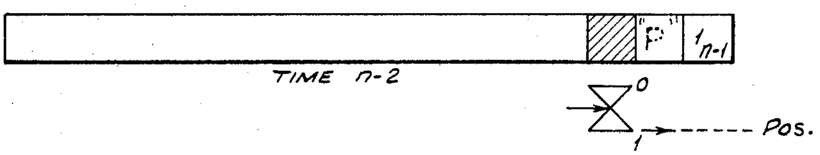
Figure 5D:
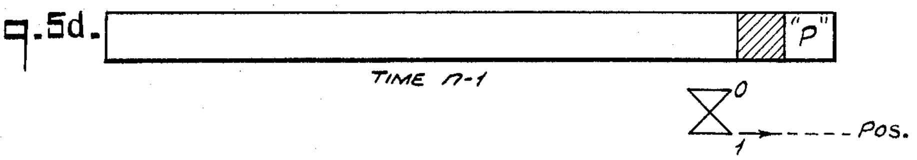

FIGURES 5*a*, *b*, *c*, and *d* are a series of diagrams representing the state of the shift register just after the occurrence of the shift pulses;

FIGURE 6 is an alternative embodiment of my invention which is utilized for even parity.

Referring now to FIGURE 1, there is shown a conventional storage device, such as a magnetic drum, coupled to conventional writing means 2, which may comprise a writing amplifier, coupled to a magnetic recording head. Read-in means are shown diagrammatically by numeral 3 which produces a number of pulses representing the bits of a word. The word is read into the shift register 4. The details of these elements are not believed to be essential to this invention as each is old in the art and may take on any one of well known forms. However, one embodiment of the shift register as well as the other components as shown are described in patent application Serial No. 175,008 of which I am a co-inventor, filed February 23, 1962, entitled Electronic Memory Attachment for Counting Machines or the Like, the contents of which are incorporated in this application by this reference.

The parity computer 5 has an input 6 which is connected to the last stage $n$ of the shift register 4. A change of state of the last stage, accordingly, will be sensed by the parity computer. Parity computer 5 has an output conductor 7 which is applied to an input conductor to the last stage $n$ and a predetermined output thereover causes stage $n$ to change its state which will provide a different input through the writing means 2 and into the storage element.

The parity computer comprises a counting means 8 which counts the number of ones for the bits numbered from 1 through $n-2$. The total information in the word is represented by bits 1 through $n-1$, but here the parity count is made only from bits 1 through $n-2$. After the $n-2$ bit has actually appeared on the last stage of the shift register, a decision is made as to whether or not the parity bit should be the same or different from the $n-1$ bit ("no complement" or "complement"). A parity implement and writing means 9 then determines whether or not to change the state of the last stage $n$ by either applying a signal over conductor 7 or by not applying such signal.

If the system is working on ODD PARITY, and the count of ones up to and including the $n-2$ bit is odd, then the decision made is "no complement." This is satisfactory since if the $n-1$ bit is zero, the $n$ bit or parity bit should be zero, and if the $n-1$ bit is one, the $n$ bit should be one.

The following summary indicates that the above described logic produces a true parity bit for any eventuality:

| | | |
|---|---|---|
| ODD PARITY | | |
| n−1 bit 0<br>1 | n−2 ODD<br>n bit 0<br>1 | Decision:<br>No complement |
| n−1 bit 0<br>1 | n−2 EVEN<br>n bit 1<br>0 | Decision:<br>Complement |
| EVEN PARITY | | |
| n−1 bit 0<br>1 | n−2 ODD<br>n bit 1<br>0 | Decision:<br>Complement |
| n−1 bit 1<br>0 | n−2 EVEN<br>n bit 1<br>0 | Decision:<br>No complement |

It is contemplated that various logical circuits may be used in a mechanization of the inventive concept of this invention, one form of which is shown in FIGURE 2. There is shown a flip-flop or binary element 11 which is entirely conventional and is shown and described more fully in my co-pending application previously mentioned. The flip-flop has input terminals designated by S and R. The normal state is referred to as the RESET state. A negative signal applied to the S terminal causes element 11 to change its state from RESET to SET, while a positive signal applied to terminal R causes the same effect. Similarly, a positive signal applied to the S terminal or a negative signal applied to the R terminal causes element 11 to change its state from SET to RESET. It may be recognized that positive signals or negative signals applied to the S and R terminals will not have an effect on element 11 if the conditions are not as just set forth. Negative or positive signals applied to the terminal C will always cause element 11 to change its state or to complement itself. The output terminals are designated OUTPUT-0 and OUTPUT-1 and in the normal or RESET condition, OUTPUT-1 is positive and in the SET condition, OUTPUT-1 is negative.

An AND gate 25 receives as inputs, OUTPUT-1 of binary 11 as well as an input $p$ signal, the timing and nature of which will be described more fully later. AND gate 25 passes a signal only upon the concurrent presence of a negative signal over conductor 10 and a negative $p$ signal.

The output $b$ from the last stage of the shift register are bits which have either a positive or negative character and are classified as one or zero. When a one appears, it is applied through OR gate 12 to cause binary 11 to change its state.

Figure 4:
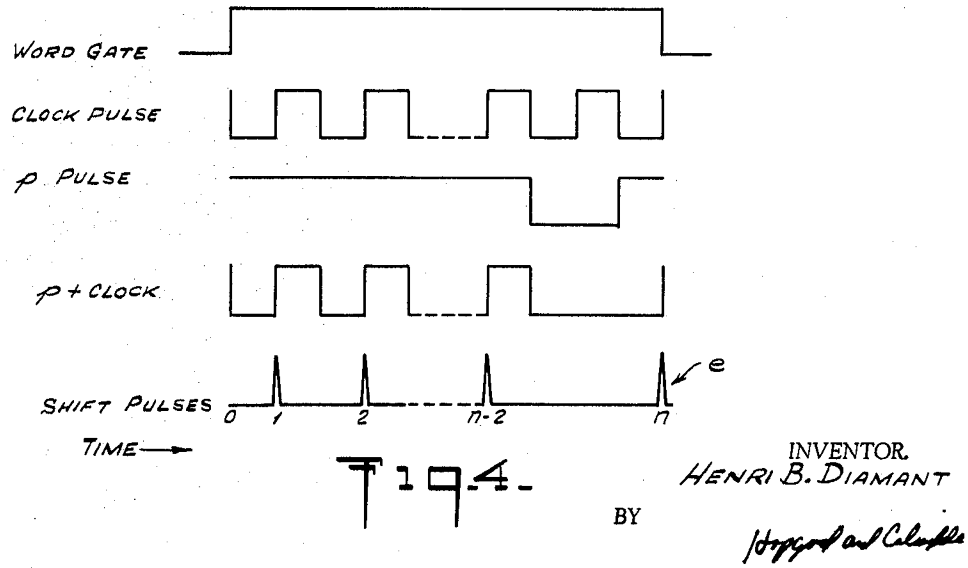
FIGURE 4 is a timing diagram showing various waveforms.

The word in the shift register is shifted therethrough by a series of shift pulses which are indicated in the bottom line of FIGURE 4. As shown in FIGURE 4, there is no $n-1$ shift pulse applied to the last stage of the shift register. During the time at which the $n-1$ shift pulse would normally occur, and for predetermined durations before and after, the negative $p$ pulse (FIGURE 4) is produced which is applied to OR gate 12 and AND gate 25.

The operation of the system may be described in conjunction with the timing chart of FIGURE 4 as well as the illustrated states of the shift register shown in FIGURES *5a–5d*.

*Operation*

At time zero, the shift register assumes the state indicated in FIGURE *5a*, and the last stage of the shift register assumes the state of the first bit. As an example, the first bit may be assumed to be zero (having a subscript 1 to indicate that it is the first bit). The output from the last shift stage may be taken from either OUTPUT-1 or from OUTPUT-0 (which would be the complement output).

Figure 3:
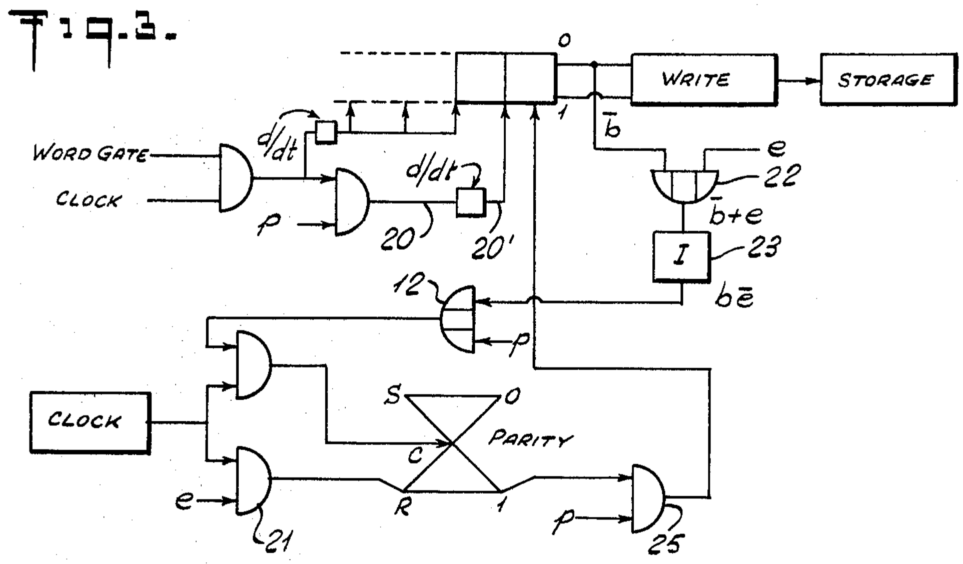
FIGURE 3 is a detailed logical diagram of the preferred form of my invention.

Referring now to FIGURE *5a* in conjunction with FIGURE 3, there is shown the shift register at time zero. The $0_1$ bit is in the last stage of the shift register and accordingly, a signal $b$ representing a one bit is applied to parity flip-flop 11. This occurs before the application of the first shift pulse.

At time $n-3$ corresponding to the $n-3$ shift pulse, the shift register has the status indicated in FIG. *5b*. The $n-2$ bit is in the last stage. The parity bit indicated by "P" has only been illustrated to show where it would fit in context with the end of the world; although the parity bit is never actually formed until the implementation of the complementing decision and then only in the last stage. After the $n-3$ shift pulse has occurred, the parity flip-flop has then determined the number of ones for $1 \ldots n-2$ bits. Assuming that such number of ones is odd, the parity flip-flop will be in the SET state, and its OUTPUT-1 terminal will be negative as indicated in FIGURE *5b*. The $n-2$ shift pulse causes the shift register to assume the status of FIGURE *5c*. However, regardless of whether the $n-1$ bit is a one, the parity flip-flop is caused to change its state, because in the absence of a $b$ signal, a $p$ signal is applied to OR—12 (see FIGURES 2 and 4). This signal causes the parity flip-flop to change its state to the RESET state as indicated in FIGURE *5c*. Thus, when the storage unit reaches the time interval in which it is to sense the status of the last stage, it will find that the last stage has the same voltage level as during the time in which the $n-1$ bit is contained therein. At this time the "P" bit is read into the storage unit as the parity bit.

It is seen that if the system is working on odd parity, the condition of the flip-flop after $n-3$ shift pulses allows it to determine the number of ones in bits 1 through $n-2$ and, therefore, to make the decision as to whether or not to complement the $n-1$ bit.

The foregoing logical system is only one mechanization of the basic concept of the invention.

FIGURE 6 shows an embodiment working on the EVEN PARITY principle. Under such circumstances, the output from the parity flip-flop is obtained from the OUTPUT-0 terminal instead of from OUTPUT-1. For purposes of providing a preferred embodiment, reference may be made to FIGURE 3. The timing chart of FIGURE 4 is intended to apply specifically to the embodiment of FIGURE 3. Again, it will be noted that the complement bit signals indicated by $\bar{b}$ will be used instead of the output from OUTPUT-1. During the interval in which the word gate of FIGURE 4 occurs, the word which has been stored in the shift register is shifted therethrough and applied to the storage medium, which might be for example a rotating storage drum. Clock pulses of the character indicated are produced during this period, and a negative pulse indicated by the $p$ pulse is present during the interval in which the $n-1$ shift pulse would normally occur. Therefore, the combination of clock pulses and $p$ pulse produces the shift train shown as $p$ plus clock in FIGURE 4, which train is applied over lead 20 indicated on FIGURE 3 to the last stage of the shift register. Actually, shift pulses are obtained by differentiating the clock pulses or the $p$ plus clock and utilizing only the leading edge so as to provide positive spikes. It will be noted that the shift pulses applied over conductor 20′ do not contain an $n-1$ pulse.

In order to obtain RESETTING after the end of the word, the clock pulses are applied to an AND gate 21 along with the last shift pulse or pulse $e$. When this occurs, the parity flip-flop assumes its RESET state. However, it is apparent that the $e$ pulse when applied to the shift register even after the entire word including the parity bit has been applied to the storage medium, the change in state of the last flip-flop could cause a complementing action; that is, a pulse could be applied to terminal C of the parity flip-flop interfering with the RESETTING operation. Accordingly, a suppression circuit is provided comprising OR gate 22 and inverter 23. The $\bar{b}$ pulse and the $e$ pulse pass through OR gate 21 and are inverted at inverter 23. Inverter 23 therefore causes an output corresponding to the logic $b\ \bar{e}$ which means that an output signal occurs only in the presence of $b$ and in the absence of $e$, and when $e$ occurs, there will be no output. Thus, it is seen that the output of inverter 23 will not cause a pulse to be applied to terminal C of the write parity to interfere with the RESETTING operation.

AND gate 25 will allow the $p$ pulse to pass therethrough only when the write parity has been conditioned or at least has decided that complementing will be required. Thus, the parity flip-flop acts to control the enabling of AND gate 25 which allows the $p$ pulse to complement or not depending upon its state. AND gate 25 therefore also controls the implementation of the complement decision.

Accordingly, there has been provided a parity computation system which allows the parity of a word to be determined by deciding whether or not to allow the parity bit to assume the state or complement the state of the $n-1$ bit.

The terms negative and positive are intended only as relative terms to distinguish two different electrical levels. The negative output may be a 0 voltage level or even a positive level, and the positive output would be at a relatively higher level. Further, while the system described operates primarily on negative pulses and negative spikes, such terms are used only in their relative sense and those skilled in the art could easily make a system which operates on positive pulses if so desired.

What is claimed is:

1. An apparatus for determining parity of a word formed of bits including
- a shift register,
- means to determine the parity of the word bits from one through $n-2$,
- means responsive to such parity means to open or close a controlling element to allow a complementing signal to be applied to the shift register at the last stage after the $n-1$ pulse appears at the last stage,
- and means to produce a pulse adapted to change the state of the last stage of the shift register during the time that the $n-1$ bit is applied thereto,
- said pulse being applied to said control element.

2. In an apparatus for applying a word formed of $n$ bits to a storage medium in which the last stage of a shift register is coupled to said storage medium and in which bits 1 . . . $n-1$ represent information bits and the $n$th bit represents the parity bit including parity computing means comprising
- means coupled to the last stage of said shift register to determine the parity of $n-2$ bits of such word, and means responsive to said determining means to change the state of said last stage after the $n-1$ bit appears in such stage.

3. An apparatus for determining the parity bit of a word formed of a plurality of bits comprising,
- a storage medium,
- a shift register in which bits of a word are serially stored,
- means to shift said bits from said shift register into said storage medium,
- means responsive to the parity of 1 through $n-2$ bits inclusive to complement or not the $n-1$ bit to form the $n$ parity bit.

4. In an apparatus for applying a word formed of $n$ bits to a storage medium in which the last stage of a shift register is coupled to said storage medium and in which bits 1 . . . $n-1$ represent information bits and the $n$th bit represents the parity bit including parity computing means comprising
- binary counting means adapted to be coupled to the last stage of said shift register to count the number of bits having a predetermined state,
- said binary counting means changing its state in response to each bit of said predetermined state,
- means producing a signal to change the state of said last stage after the $n-1$ bit has appeared in said last stage and read into said storage medium,
- gating means coupled to said signal producing means to allow said signal to pass to said last stage,
- said gating means being enabled in accordance with the state of said binary counting means.

5. In an apparatus for applying a word formed of $n$ bits to a storage medium in which the last stage of a shift register is coupled to said storage medium and in which bits 1 . . . $n-1$ represent information bits and the $n$th bit represents the parity bit including parity computing means comprising
- binary counting means adapted to be coupled to the last stage of said shift register to count the number of bits having a predetermined state,
- said binary counting means changing its state in response to each bit of said predetermined state,
- means producing a signal to change the state of said last stage after the $n-1$ bit has appeared in said last stage and read into said storage medium,
- gating means coupled to said signal producing means to allow said signal to pass to said last stage,
- said gating means being enabled in accordance with the state of said binary counting means,
- and means to suppress the $n-1$ shift pulse applied to said last stage.

6. The computing means of claim 5 including means to supress the output from said last stage to said binary counting means at the time of the occurrence of the last shift pulse.

7. An apparatus for determining parity of a word formed of bits including
- a shift register,
- means to determine the parity of the word bits from one through $n-2$,
- means responsive to such parity means to open or close a controlling element to allow a complementing signal to be applied to the shift register at the last stage after the $n-1$ pulse appears at the last stage,
- and means to produce a pulse adapted to change the state of the last stage of the shift register during the time that the $n-1$ bit is applied thereto,
- said pulse being applied to said control element,
- and means to suppress the $n-1$ shift pulse applied to said last stage.

8. An apparatus for determining parity of a word formed of bits including
- a shift register,
- means to determine the parity of the word bits from one through $n-2$,
- means responsive to such parity means to open or close a controlling element to allow a complementing signal to be applied to the shift register at the last stage after the $n-1$ pulse appears at the last stage,
- and means to produce a pulse adapted to change the state of the last stage of the shift register during the time that the $n-1$ bit is applied thereto,
- said pulse being applied to said control element,
- means to apply shift pulses to each of the stages of said shift register,
- and means to suppress the $n-1$ shift pulse applied to said last stage.

9. The parity computing means of claim 8 having
- a shift register means coupled thereto,
- means to apply shift pulses to each stage of said shift register, means to suppress the shift pulse normally following the $n-2$ shift pulse which is applied to the last stage of said shift register.

10. The apparatus of claim 9 including means to suppress the output from said last stage to said binary counting means at the time of the occurrence of the last shift pulse.

11. In an apparatus for applying a word formed of $n$ bits to a storage medium in which the last stage of a shift register is coupled to said storage medium and in which bits $1 \ldots n-1$ represent information bits and the $n$th bit represents the parity bit including parity computing means comprising binary counting means adapted to be coupled to the last stage of said shift register to count the number of bits having a predetermined state, said binary counting means changing its state in response to each bit of said predetermined state, an AND gate being enabled in accordance with the state of said binary counting means, means to produce a signal after the $n-1$ bit has appeared in said last stage and read into said storage medium and coupling said signal to said AND gate, said AND gate passing said signal to said last stage when it is enabled.

References Cited by the Examiner

UNITED STATES PATENTS 3,037,191 5/1962 Crosby ____________ 340—146.1

ROBERT C. BAILEY, *Primary Examiner.*

MALCOLM A. MORRISON, *Examiner.*

P. L. BERGER, M. P. ALLEN, *Assistant Examiners.*